United States Patent [19]
Santerre

[11] 3,709,074
[45] Jan. 9, 1973

[54] TOOL HOLDER FOR AUTOMATIC SCREW MACHINE

[76] Inventor: Gerard H. Santerre, 9 Dorset Road, New Britain, Conn. 06052

[22] Filed: Jan. 15, 1971

[21] Appl. No.: 106,700

Related U.S. Application Data

[63] Continuation-in-part of Ser. No. 845,416, July 28, 1969, abandoned.

[52] U.S. Cl. .................................................82/36 R
[51] Int. Cl. ..........................................B23b 29/26
[58] Field of Search ............82/25, 36, 37, 35; 29/57

[56] References Cited

UNITED STATES PATENTS

| | | | |
|---|---|---|---|
| 2,266,695 | 12/1941 | Wettig | 82/36 X |
| 3,387,516 | 6/1968 | Martin | 82/25 |
| 2,473,367 | 6/1949 | Fersing | 29/57 |
| 1,230,974 | 6/1917 | Abbott | 29/57 |

FOREIGN PATENTS OR APPLICATIONS

| 123,124 | 10/1948 | Sweden | 82/36 |
|---|---|---|---|

Primary Examiner—Leonidas Vlachos
Attorney—McCormick, Paulding & Huber

[57] ABSTRACT

A tool holder for an automatic screw machine includes and L-shaped base portion with one leg secured to the machine's axially reciprocable tool support fixture, and includes an upstanding leg or web which carries an elongated cutting tool oriented parallel to the axis of the machine. A second tool is also provided on the upstanding web, and in one version is oriented perpendicularly with respect to the first tool for cutting cup-shaped workpieces, and in another version is oriented parallel to said first tool, both versions being particularly suited to machining cup-shaped workpieces.

12 Claims, 11 Drawing Figures

PATENTED JAN 9 1973

INVENTOR
GERARD H. SANTERRE

BY McCormick, Paulding & Huber

ATTORNEYS

PATENTED JAN 9 1973 3,709,074

INVENTOR.
GERARD H. SANTERRE 3,709,074

TOOL HOLDER FOR AUTOMATIC SCREW MACHINE

BACKGROUND OF THE INVENTION

This application is a continuation-in-part of my earlier application of the same title filed July 28, 1969, under Ser. No. 845,416 and now abandoned.

While automatic screw machines have long been adapted for use in machining cup-shaped workpieces, it has been characteristic of the setups required in accomplishing this task that the present approaches have certain disadvantages. One approach has been to utilize several successive stations in the multiple spindle machine for forming the inside and bottom walls thereof, and also in forming the upper or outer rim or edge thereof. More commonly a tool holder is provided with a canted cutting tool suitably formed at its cutting end for forming the desired cup-shaped depression in the workpiece. The first mentioned approach suffers from the disadvantage that the dimensional tolerances which can be held between the bottom or inner wall of the workpiece and the rim or edge thereof are severely limited when successive stations in the machine are required to be used in the machining operation. The last mentioned approach suffers from the disadvantage that wear of the cutting tool itself causes excessive dimensional variations for event the shortest workpiece runs in the machining operation.

The primary object of the present invention therefor, is to provide a tool holder for use in a automatic screw machine wherein cup-shaped workpieces can be machined or formed at a single station with the dimensional tolerances between successive workpieces being held within acceptable levels even for relatively long workpiece runs in the machining operation.

A more specific object of the present invention is to provide a novel tool holder for use in an automatic screw machine wherein a plurality of cutting tools is arranged on a single workpiece holder for use at a single station of a multispindle machine, all of which cutting tools are independently adjustable with respect to one another and with respect to the principal axis of rotation of the workpiece being machined at a particular station.

SUMMARY OF THE INVENTION

The present invention relates generally to tool holders for use in automatic screw machines, and deals more particularly with a novel tool holder wherein a first or primary elongated cutting tool of generally rectangular cross-section is adjustably mounted in the tool holder, and wherein one or more secondary or auxiliary cutting tools can be oriented in either perpendicular or parallel relationship to the primary cutter in the same tool holder. The tool holder comprises a base portion adapted for attachment to the ways provided on the axially reciprocable work support fixtures of the automatic screw machine, and slide blocks are provided on suitable ways defined in an upstanding web or leg on the base so as to permit both cutting tools to be adjustably mounted thereon.

DETAILED DESCRIPTION OF THE FIRST PREFERRED EMBODIMENT (FIGS. 1 – 6)

Figure 1:
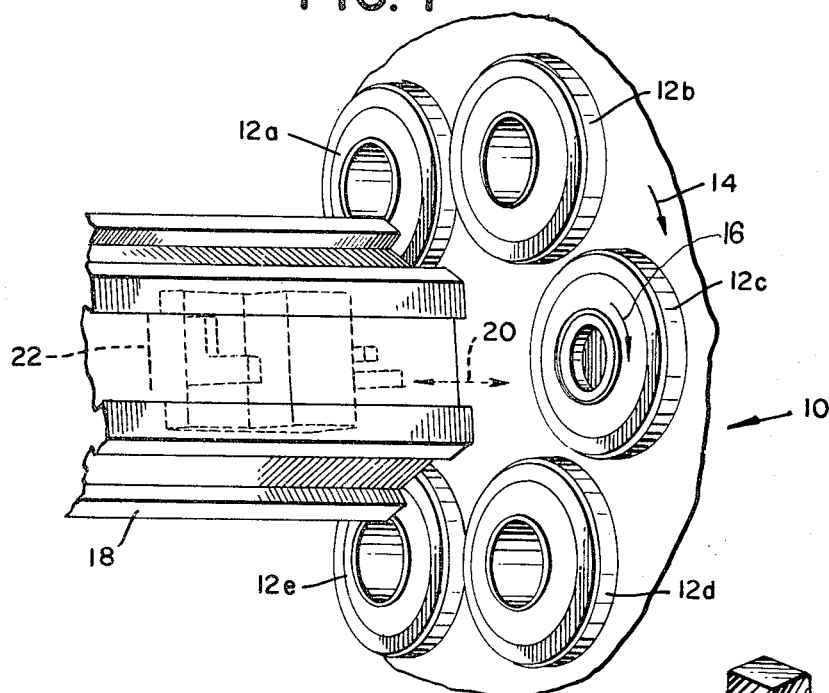
FIG. 1 is a perspective view showing the relevant portions of an automatic screw machine, with a tool holder of the present invention being mounted on the axially reciprocable tool support fixture for movement toward and away from a workpiece provided at a particular spindle station in the machine.

Turning now to the drawings in greater detail, FIG. 1 shows a multi-spindle automatic screw machine of the type with which the present invention is adapted for use, the turret of the machine being indicated generally at 10, and the spindle stations being indicated at 12a through 12g inclusively. In such an automatic screw machine the turret is adapted to be rotated in the direction of the arrow 14, and the material from which the workpieces are to be formed are advanced from right to left to the various stations 12a–12g inclusively. Thus, a plurality of rods of barstock are adapted to be fed from the rear of the machine to these work stations and to be rotated at these stations as indicated by the arrow 16 at station 12c. At this particular station a bar is provided from which the workpiece will ultimately be formed in a final severing step by a cutoff tool (not shown). A tool support fixture is adapted to be moved axially in the direction of the arrow 20 for movement of a plurality of tools toward and away from the workpieces at the various stations in the machine. One such tool is shown at 22, being constructed according to the present invention and is adapted for movement between the relative positions shown as the tool fixture 18 oscillates axially in a conventional manner.

Figure 2:
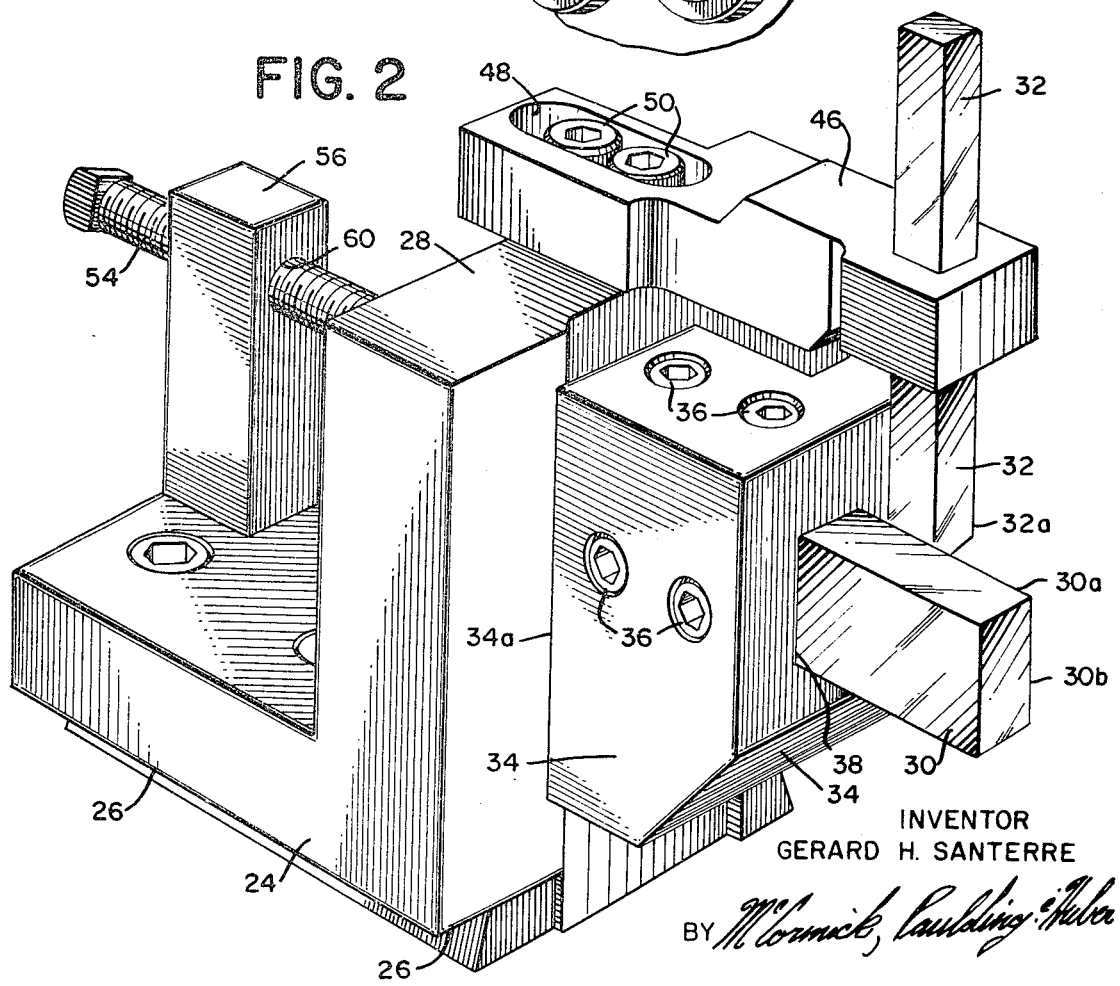
FIG. 2 is a perspective view of the tool holder of the present invention showing the inner, or cutting ends of the first and second cutting tools.

FIG. 2 shows one embodiment of the present invention as viewed from the rear or turret associated end of the machine, and as shown said tool holder comprises an L-shaped base 24 having a lower leg 26 with a keyway or slide being defined on the underside thereof for permitting attachment of the tool holder to the tool support fixture 18 of the automatic screw machine at a particular axial position. An upstanding web, or leg 28, of the tool holder base 24 has provided thereon suitable means for supporting a first elongated cutting tool 30 oriented in generally parallel relationship to the principal axis and to the axis of rotation of the workpiece 16. A second cutting tool 32 is also mounted to the upstanding web or leg 28, by suitable means to be described, and is oriented generally perpendicularly with respect to the first cutting tool 30 so that the respective end portions of these cutting tools are adapted to form the inner side and bottom walls of the generally cup-shaped workpiece and also simultaneously forming at least the rim or edge portion of the workpiece. More particularly, the generally rectangular primary, or first cutting tool 30 has a longitudinal edge 30a which is adapted to cut the inner side wall of the cup-shaped workpiece, and the inner end thereof has an edge portion 30b for forming the bottom wall of the cup-shaped workpiece. The second cutting tool 32 has a longitudinal edge 32a for forming the rim or edge portion of the cup-shaped workpiece and all of these machining operations are carried out at a single spindle station in the automatic screw machine. The actual cutting tools are of relatively simple geometrical size and shape and tool wear is not a factor severely effecting dimensional tolerances. This configuration can be contrasted with the complex, canted, cutting tools heretofore required for the formation of cup-shaped workpieces in such machines, as for example the trepanning type cutting tool arrangements heretofore utilized for this machining operation.

Figure 3:
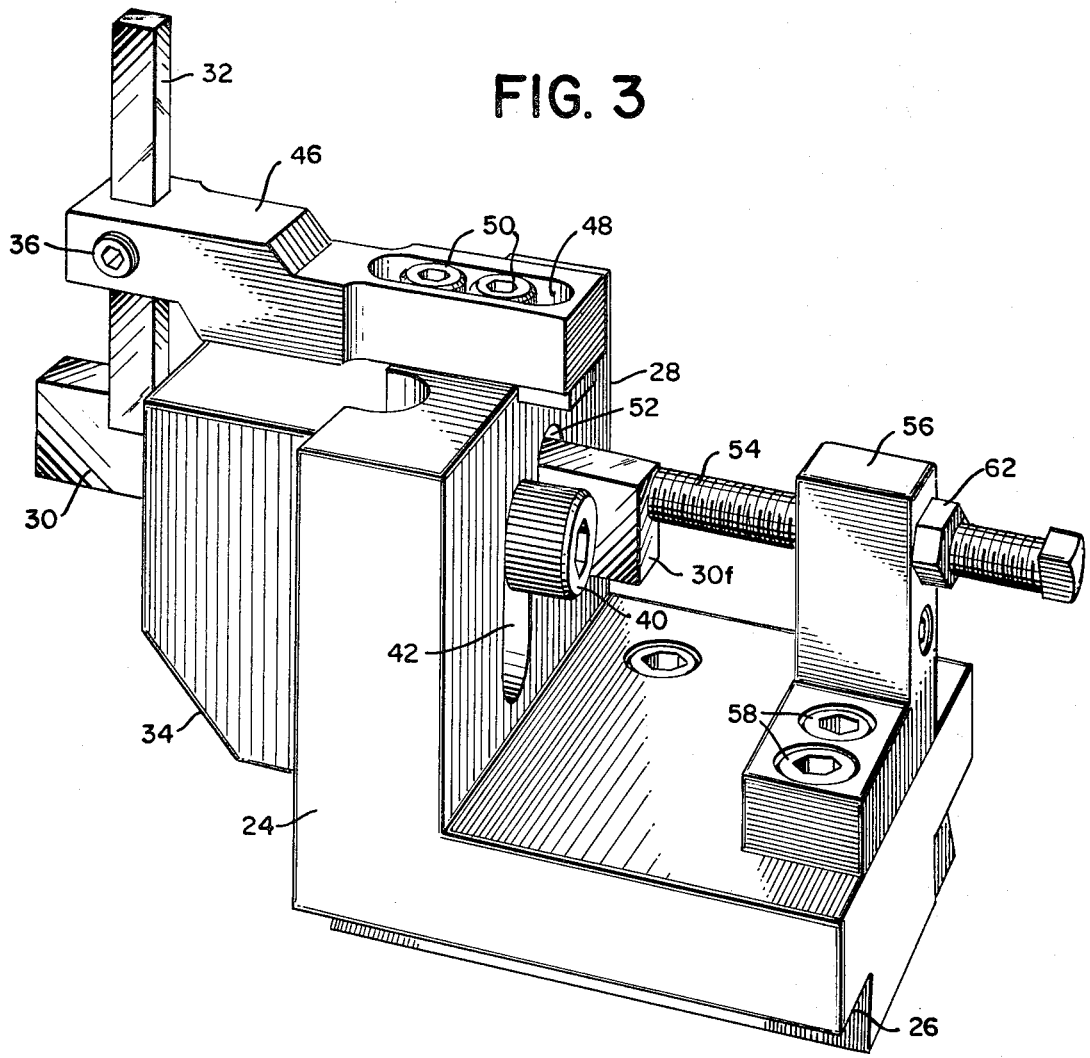
FIG. 3 is a perspective view of the tool holder of FIG. 2, being taken from the outer or rear side thereof.
Figure 4A:
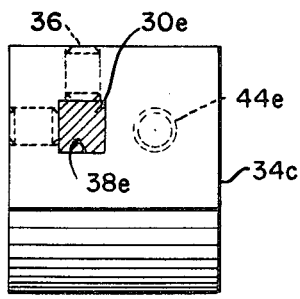
FIGS. 4A, 4B and 4C show slide blocks of alternative construction for carrying primary cutting tools of different size.
Figure 4B:
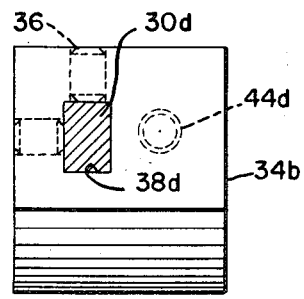

Considering next the means for adjustably mounting the first cutting tool 30 to the base, FIGS. 2 and 3 show a first slide block 34 having an inner face 34a which is adapted to be slidably received in suitable ways defined on this upstanding leg or web 28. As best shown in FIG. 2 clamping screws 36, 36 are provided in the slide block 34 for anchoring or securing the cutting tool 30 in a rectangular opening 38 provided for this purpose in the slide block. FIGS. 4A and 4B show slide blocks 34b and 34c of alternative construction for holding cutters 30d and 30e of somewhat smaller cross-sectional rectangular size than the cutter 30 shown in FIG. 4C. Thus, the machine operator can use a single base 24 for use in machining cup-shaped workpieces of various size by exchanging the slide block 34 for a slide block of slightly smaller opening size as indicated generally at 38d and 38e in FIGS. 4A and 4B to accommodate cutters 30d and 30e of smaller size in machining workpieces of smaller configuration. As best shown in FIG. 3, a clamping screw 40 extends through a slot 42 in the upstanding web or leg 28 of the base, and is threadably received in a threaded opening 44 provided for this purpose in the slide block 34 so as to permit anchoring the slide block 34 in a predetermined location on the tool holder base 24. Thus, convenient means is provided for adjustably mounting the first cutting tool 30 to the base in order to allow at least limited adjustability of the said tool 30 parallel to itself generally toward and away from the axis of rotation of the workpiece in order to allow for variations in the inside diameter of the cup-shaped workpieces to be machined.

Figure 6:
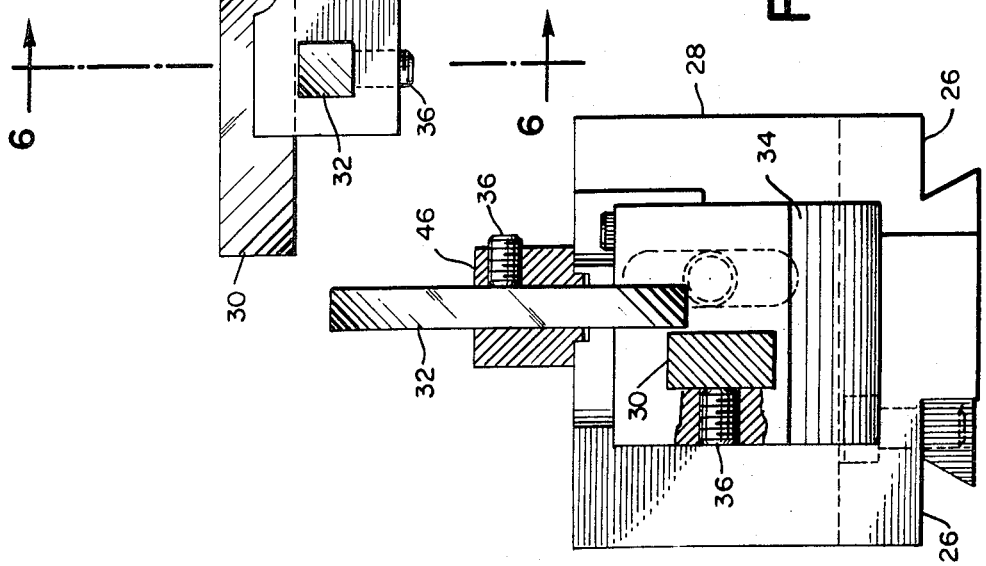
FIG. 6 is a sectional view taken on the line 6—6 of FIG. 5 showing the cutting tools in elevation as seen from the inner end of the tool holder.

In further accordance with the present invention, means is provided for adjustably mounting the second cutting tool 32 to the base in order to allow for at least limited adjustment of said cutting tool's edge 32a with respect to the inner end 30b of the first tool 30 so as to allow for variations in the depth of said cup-shaped workpiece. Preferably, and as best shown in FIG. 6 said means comprises a second slide block 46 which has an elongated slot 48 defined therein, which slide is oriented in parallel relationship to the longitudinal axis of the primary cutter 30. Screw means is provided and extends through a slot 48 in the second slide block 46 to be threadably received in the upstanding web, or leg 28, of the base. As best shown in FIG. 3 said screw means comprises a pair of clamping screws 50, 50. A set screw 36 is threadably received in the cantilevered end portion of the second slide block 46 for anchoring the second cutting tool 32 in a predetermined position with respect to the primary cutter 30, and more particularly with respect to the longitudinal cutting edge 30a thereof.

In further accordance with the present invention, the primary cutting tool 30 not only extends through a rectangular opening provided for this purpose in the slide block, but as best shown in FIG. 3 said cutter 30 also extends through a second or additional elongated slot 52 provided for this purpose in the upstanding leg or web 28 of the base for added support of the primary cutter 30 during the machining operation. The said elongated slot 52 allows vertical adjustability of the primary cutter 30 in the manner described hereinabove, and also permits a stop screw 54 to be provided for engagement with the outer end 30f of the primary cutter 30 to further aid in supporting the same during the machining operation. An upstanding post member 56 is provided adjacent the outer end of the lower leg 26, being secured thereto by the screws 58, 58 and a threaded opening 60 adjacent the upper end portion of the post 56 threadably receives the stop screw 54 for mounting said screw in position to support the primary cutter 30 against axial movement in its associated slots 38 and 52 in the slide block 34 and upstanding web or leg 28 respectively. Finally, a lock nut 56 is provided on the stop screw 54 in order to prevent inadvertent rotation of the latter with respect to the post 56 during the machining operation.

As so constructed and arranged, the present invention provides a unique tool holder for machining cup-shaped workpieces in an automatic screw machine. Superior results are achieved through improved dimensional tolerances as a result of providing at least two mutually perpendicular cutting tools and finish forming the bottom and inside walls of the workpiece at the same time that the rim or edge is formed. This result is attained with rectangular cutters of simple geometric shape which can be readily reground and are not susceptible to the dimensional inaccuracies heretofore encountered when using trepanning tools or the like.

DETAILED DESCRIPTION OF THE SECOND PREFERRED EMBODIMENT (FIGS. 7, 8 AND 9)

Figure 7:
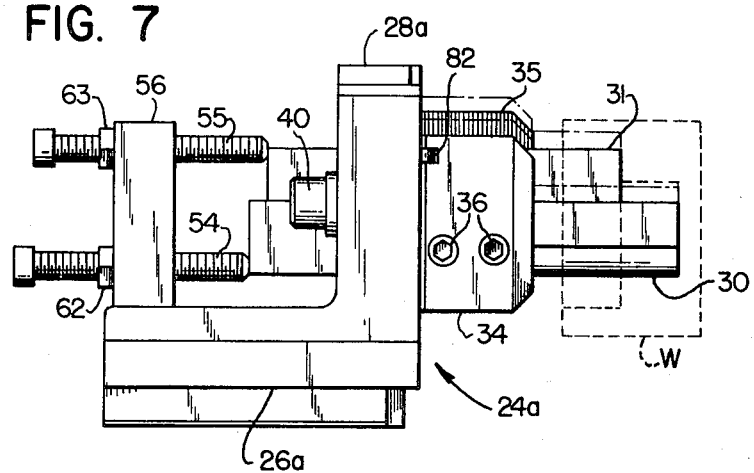
FIG. 7 is an elevational view of a tool holder of alternative design wherein the first and second tools are oriented parallel to one another.
Figure 8:
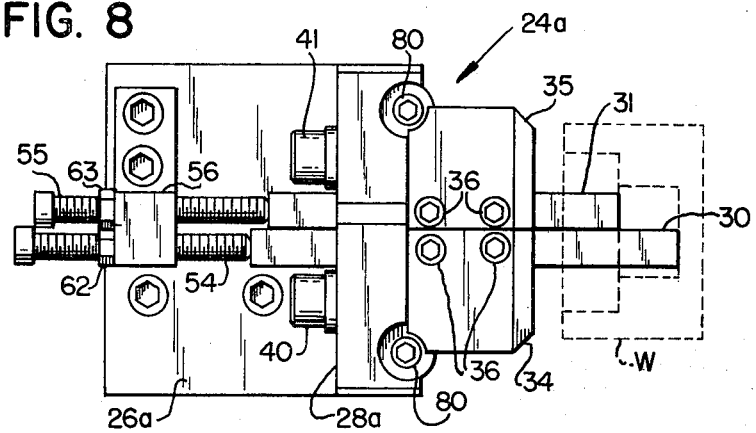
FIG. 8 is a plan view of the FIG. 7 holder with a cup-shaped workpiece being shown in broken lines in this and in the preceding view.
Figure 9:
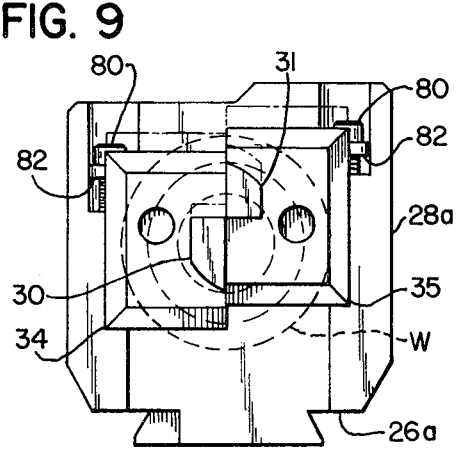
FIG. 9 is an end-on front view of the holder showing the tools in relation to the workpiece.

FIGS. 7, 8 and 9 show a second or alternative embodiment of a tool holder constructed in accordance with the present invention, and said holder is intended to be mounted on a support fixture 18 in a multi-spindle automatic screw machine of the type described with reference to the preceding embodiment.

The tool holder of FIGS. 7, 8 and 9 comprises an L-shaped base 24a, the lower leg 26a of which base has a key-way or slide on the underside thereof to permit the tool holder to be readily attached to the tool support fixture 18 of the machine.

An upstanding leg, or web 28a, of the tool holder base 24a has provided thereon suitable means for supporting two cutting tools at least one of which 30 is oriented in generally parallel relationship to the axis of rotation of the cup-shaped workpiece W to be machined. While another cutting tool might be mounted to the upper end of the web by means such as described hereinabove to support such a tool in perpendicular relationship to the parallel tool, the FIG. 7 tool holder preferably is provided with a second cutting tool 31 parallel to the first tool 30 and hence also parallel to the axis of rotation of the workpiece W.

Figure 4C:
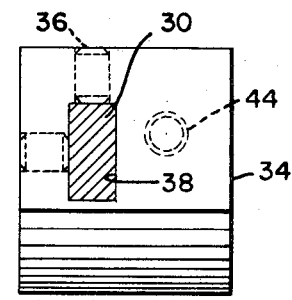
Figure 5:
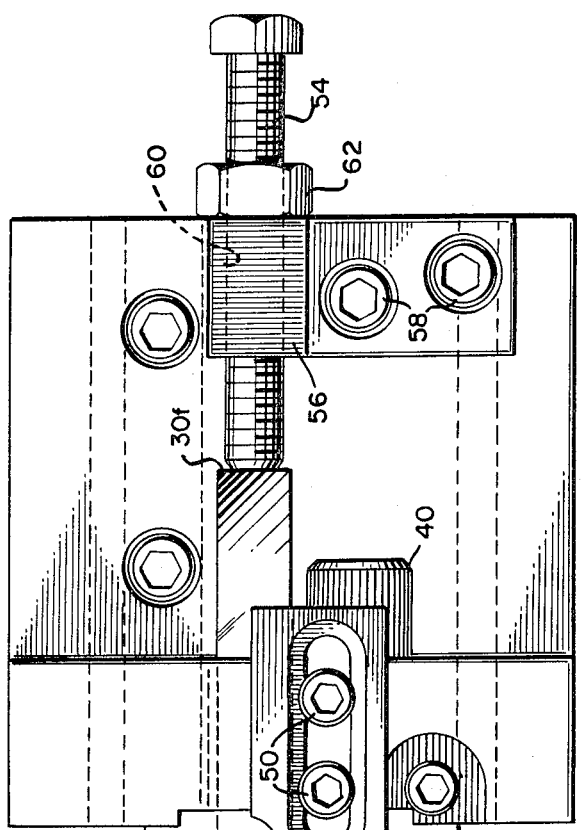
FIG. 5 is a plan view of the tool holder and assembled cutting tools shown in FIGS. 2 and 3.

The first cutting tool 30 has a longitudinal edge 30a for cutting the inner side wall of the cup-shaped workpiece W, and the inner end of this tool has an edge portion 30b for forming the bottom wall of the cup-shaped workpiece. Thus, the tool 30 serves the same purpose as that of the first tool 30 described with reference to the preceding embodiment. The first tool 30 is anchored in the slide block 34 by clamping screws 36, 36 and depending upon the size of this first, or primary tool 30, other slide blocks might be alternatively used as in the previous embodiment. The tool 30 is of elongated rectangular shape and fits in an opening of corresponding size in the slide block being used. FIGS. 4A, 4B and 4C show three different sized blocks any one of which could be mounted to the upstanding web 28a. Each of these slide blocks has way defining means on its rear face for mating with a complementary surface on the web 28a. A clamping screw 40 extends through a slot in the web, and into a threaded opening in the slide block 34 to hold the first tool 30 at the desired height above the key-way 26a on the holder base 24a. A vertically extending screw 80 is treadably received in the web 28a, and has a head portion 82 received in a groove in the slide block to accomplish the desired preliminary set-up for this tool 30. This adjustment feature is shown and described with reference to the preceding embodiment and need not be described in detail herein since its purpose is obvious from the drawings.

Finally, the tool 30 is further supported from the rear by means of the stop screw 54, which is threadably received in a threaded opening provided for this purpose in a post 56. The forward end of the screw 54 engages the rear end of the tool 30 and a lock nut 62 screws the screw in the post 56 as in the previous embodiment.

As mentioned above, the first tool is rectangular, and so oriented with respect to the axis of the workpiece as to form at least a portion of the workpiece inner side wall, and its bottom wall. In the present embodiment, this inner wall of the workpiece is stepped in diameter, and therefor a second cutting tool 31 is provided alongside the first for forming the stepped portion of this inner side wall. The advantages to so mounting the second cutting tool are many, and chief among these is the capability for carrying out a very precise finish cut with the second tool 31. The first, or primary tool 30 will have made part of its cut prior to the time at which the second tool engages the workpiece, leaving only a depth of cut for the latter dictated by the difference in diameters of the stepped inner side wall portions. It will also be apparent that the second cutting tool could be so arranged as to finish the lip of the cup-shaped workpiece by simply locating its slide block 35 slightly higher on the web 28a.

The second cutting tool 31 is supported in the slide block 35 by screws 36, 36, and the block is mounted to the web 28a in the same manner as the first block. A clamping screw 41 locks the block 35 to the web 28a, and a stop screw 55 holds the tool 31 against movement during the machining operation. An adjustment screw 80 is used to set the second block 35 at the proper height with respect to the first block 34.

I claim:

1. In a machine tool of the type which rotates workpieces at a work station and wherein a tool support fixture is adapted for axial movement toward and away from the workpiece, the improvement comprising a tool holder base adapted for attachment to said support fixture, said base having an upstanding web with an elongated slot, a first slide block adjustably mounted to said web for limited movement toward and away from the axis of movement of said fixture, said slide block having a threaded opening generally aligned with said elongated slot, a slide block clamping screw extending through said slot and threadably received in said block opening for clamping said block to said web in a predetermined position, and a first cutting tool mounted to said slide block, said tool having an elongated rectangular shape with one end portion so shaped as to form the inner, side and bottom walls of a generally cup-shaped workpiece, and a second cutting tool mounted to said web and having a cutting edge for forming still another surface of said cup-shaped workpiece means for adjustably mounting said second cutting tool to said web, said means including a second slide block with an elongated slot, screw means extending through said slot and threadably received in said web for clamping said second slide to said base in a predetermined position.

2. The combination defined in claim 1 further characterized by said second cutting tool comprising an elongated rectangular tool oriented generally perpendicularly with respect to said first cutting tool.

3. The combination defined in claim 1 further characterized by said second cutting tool comprising an elongated rectangular tool oriented generally parallel with respect to said first cutting tool.

4. The combination defined in claim 3 wherein said second slide block is carried on the upper end of said web and wherein said means for adjustably mounting said second slide block to said web comprises a pair of clamping screws threadably received in the upper end of said web to permit adjustment of said second slide block parallel said axis of movement of said fixture, and means for clamping said cutting tool in said second block so that it is oriented perpendicular to said first cutting tool.

5. The combination defined in claim 4 wherein said second slide block is adjustably mounted to said web for limited movement parallel said first slide block, said second slide block having a threaded opening parallel to said threaded opening in said first slide block and a second slide block clamping screw extending through a second slot in said web oriented parallel to said first slot, and said second clamping screw threadably received in said second slide block, and means for clamping said second cutting tool in said second slide block so that it is oriented parallel to said first tool.

6. The combination defined in claim 1 further characterized in that said tool holder base further includes an upstanding post member spaced from and oriented generally parallel to said web, and a first stop screw threadably received in said post member for engaging the end of said first cutting tool opposite said one end thereof to prevent inadventent axial movement of said first tool.

7. The combination defined in claim 6 further characterized by means for adjustably mounting said second cutting tool to said web, said means including a second slide block with an elongated slot, screw means extending through said slot and threadably received in said web for clamping said second slide block to said base in a predetermined position.

8. The combination defined in claim 7 further characterized by said second cutting tool comprising an elongated rectangular tool oriented generally parallel with respect to said first cutting tool.

9. The combination defined in claim 8 wherein said second slide block is adjustably mounted to said web for limited movement parallel said first slide block, said second slide block having a threaded opening parallel to said threaded opening said first slide block and a second slide block clamping screw extending through a second slot in said web oriented parallel to said first slot, and said second clamping screw threadably received in said second slide block, and means for clamping said second cutting tool in said second slide block so that it is oriented parallel to said first tool.

10. The combination defined in claim 9 further characterized by a second stop screw threadably received in said post member for engaging that end of said second cutting tool opposite the workpiece engaging end located adjacent said one end of said first cutting tool.

11. The combination defined in claim 10 wherein said web further includes first and second slots for said first and second cutting tools respectively, said tools extending through said slots to provide lateral support therefor during the machining operation.

12. The combination defined in claim 11 wherein said first and second slide blocks are received in ways defined for this purpose in said web to prevent inadvertent movement of said blocks during the machining operation.

* * * * *